US008001304B2

United States Patent
Yung et al.

(10) Patent No.: US 8,001,304 B2
(45) Date of Patent: Aug. 16, 2011

(54) PORTABLE MEMORY DEVICE WITH MULTIPLE I/O INTERFACES WHEREIN EACH I/O INTERFACE HAS RESPECTIVE PROTOCOL AND DEVICE PARAMETERS ARE REQUESTED FROM ONE I/O INTERFACE USING ONLY RESPECTIVE PROTOCOL

(75) Inventors: Ka Ian Yung, Mountain View, CA (US); Steven Sprouse, San Jose, CA (US); Dhaval Parikh, Santa Clara, CA (US); Nathan Rapaport, Ma'alot (IL)

(73) Assignee: SanDisk Technologies Inc., Plano, TX (US)

( * ) Notice: Subject to any disclaimer, the term of this patent is extended or adjusted under 35 U.S.C. 154(b) by 853 days.

(21) Appl. No.: 12/032,501

(22) Filed: Feb. 15, 2008

(65) Prior Publication Data

US 2009/0210637 A1   Aug. 20, 2009

(51) Int. Cl.
  *G06F 13/12* (2006.01)
  *G06F 3/00* (2006.01)
  *G06F 12/00* (2006.01)
  *H01R 25/00* (2006.01)
  *G06F 1/16* (2006.01)
(52) U.S. Cl. .......... 710/74; 710/301; 710/305; 710/102; 710/62; 710/63; 710/64; 710/300; 710/1; 710/8; 710/10; 710/11; 710/13; 710/16; 710/38; 711/154; 711/103; 711/115; 711/159; 235/486; 235/492
(58) Field of Classification Search .................. None
See application file for complete search history.

(56) References Cited

U.S. PATENT DOCUMENTS

| | | | | |
|---|---|---|---|---|
| 6,192,420 | B1 * | 2/2001 | Tsai et al. | 710/10 |
| 6,385,677 | B1 * | 5/2002 | Yao | 711/115 |
| 6,438,638 | B1 * | 8/2002 | Jones et al. | 710/301 |
| 6,658,516 | B2 * | 12/2003 | Yao | 710/301 |
| 6,744,634 | B2 * | 6/2004 | Yen | 361/752 |
| 6,813,662 | B2 * | 11/2004 | Park | 710/74 |
| 7,108,560 | B1 * | 9/2006 | Chou et al. | 439/660 |
| 7,114,015 | B2 * | 9/2006 | Alva et al. | 710/38 |

(Continued)

OTHER PUBLICATIONS

International Search Report and Written Opinion of the International Searching Authority dated Jul. 29, 2009 in PCT Application No. PCT/US2009/032487.

*Primary Examiner* — Tammara Peyton
(74) *Attorney, Agent, or Firm* — Vierra Magen Marcus & DeNiro LLP

(57) ABSTRACT

A non-volatile storage device has first and second controllers that provide external access to non-volatile memory using different protocols. In response to a request from the first controller, the second controller retrieves parameters from the non-volatile memory and provides the retrieved parameters to the first controller. In one embodiment, the device parameters are USB descriptors, which may include a vendor ID, a product ID, a product string, and/or a serial number. The first controller may be a Universal Serial Bus (USB) card reader controller. Examples of the second controller include a Secure Digital (SD) controller, a CompactFlash (CF) controller, a MemoryStick controller, or a different type of controller that is able to provide external access to the non-volatile memory. The first controller provides the device parameters to a host during enumeration of the non-volatile storage device. The device parameters may be used to establish settings for the first controller.

49 Claims, 8 Drawing Sheets

U.S. PATENT DOCUMENTS

| | | | |
|---|---|---|---|
| 7,133,938 B2 * | 11/2006 | Nagao | 710/10 |
| 7,213,766 B2 * | 5/2007 | Ryan et al. | 235/492 |
| 7,218,528 B2 * | 5/2007 | Chen | 361/737 |
| 7,254,650 B2 * | 8/2007 | Lin et al. | 710/11 |
| 7,337,261 B2 * | 2/2008 | Sukegawa et al. | 710/313 |
| 7,409,477 B2 * | 8/2008 | Wyatt et al. | 710/62 |
| 7,535,718 B2 * | 5/2009 | Le | 361/737 |
| 7,554,813 B2 * | 6/2009 | Miller et al. | 361/737 |
| 7,597,250 B2 * | 10/2009 | Finn | 235/380 |
| 7,620,844 B2 * | 11/2009 | Mambakkam et al. | 714/6.12 |
| 7,641,118 B2 * | 1/2010 | Schade | 235/486 |
| 7,660,921 B2 * | 2/2010 | Schenk | 710/62 |
| 7,680,974 B2 * | 3/2010 | Brewer et al. | 710/301 |
| 7,762,470 B2 * | 7/2010 | Finn et al. | 235/492 |
| 7,809,866 B2 * | 10/2010 | Liu et al. | 710/62 |
| 7,872,873 B2 * | 1/2011 | Hiew et al. | 361/737 |
| 7,921,255 B2 * | 4/2011 | Sprouse et al. | 711/103 |
| 7,934,037 B2 * | 4/2011 | Chou et al. | 710/301 |
| 2003/0100203 A1 * | 5/2003 | Yen | 439/79 |
| 2003/0167376 A1 | 9/2003 | Koh | |
| 2004/0243756 A1 | 12/2004 | Lin et al. | |
| 2004/0260855 A1 * | 12/2004 | Schade | 710/305 |
| 2005/0182858 A1 * | 8/2005 | Lo et al. | 710/1 |
| 2005/0251593 A1 | 11/2005 | Lin et al. | |
| 2006/0047861 A1 * | 3/2006 | Hung et al. | 710/11 |
| 2007/0233910 A1 | 10/2007 | Paley et al. | |
| 2007/0283053 A1 * | 12/2007 | Liu et al. | 710/11 |
| 2008/0237357 A1 * | 10/2008 | Stranges et al. | 235/492 |
| 2008/0288698 A1 * | 11/2008 | Lin et al. | 710/301 |
| 2009/0327529 A1 * | 12/2009 | Mardiks | 710/11 |

* cited by examiner

PORTABLE MEMORY DEVICE WITH MULTIPLE I/O INTERFACES WHEREIN EACH I/O INTERFACE HAS RESPECTIVE PROTOCOL AND DEVICE PARAMETERS ARE REQUESTED FROM ONE I/O INTERFACE USING ONLY RESPECTIVE PROTOCOL

TECHNICAL FIELD

The present invention relates to providing device parameters that pertain to a non-volatile storage device.

BACKGROUND

Peripheral devices such as non-volatile storage devices often have a need for providing device parameters that pertain to the device. For example, when a peripheral device is initially attached to a host (e.g., computer or other device) the host may request device parameters. As a particular example, when a USB device is initially attached to a host computer system and powered-on, the host will request the USB device for device parameters during an enumeration process.

The USB device reports its device parameters to the host using USB descriptors, which are data structures that describe information such as what the device is, what vendor makes the device, and what version of the USB protocol the device supports. Examples of USB descriptor types include device descriptors, string descriptors, configuration descriptors, interface descriptors, and endpoint descriptors.

Device descriptors include general information about the USB device such as a vendor identifier (VID), a product identifier (PID), and a device release number. The VID is a value that uniquely identifies the vendor of the USB device. The PID is a value that uniquely identifies the particular product of the vendor. The device release number is a binary coded decimal that identifies the device release.

String descriptors, if used, describe the manufacturer, the product, and the device's serial number. The USB device may include string descriptors in multiple languages. The host is allowed to specify the desired language of strings returned by the USB device. Thus, the host can display information from the string descriptors to the user in the desired language.

The configuration descriptors include information about a specific device configuration, the interface descriptors describe a specific interface within a configuration, and the endpoint descriptors describe endpoints used for an interface.

Based on the USB descriptors, the host determines a suitable a device driver for the USB device and establishes a communication channel with the USB device. Further details of USB enumeration are available in the Universal Serial Bus Specification, Revision 2.0, Apr. 27, 2000, which is hereby incorporated by reference in its entirety.

USB descriptors are an example of one type of device parameters. Another example of device parameters are those used to offset the effect of semiconductor process variations. For example, a USB device has components whose characteristics are affected by process variation. The USB device may have a register for storing "trim" bits that are used to compensate for the process variation. As a particular example, the resistance of a USB component can be adjusted based on the trim bits.

In order to be able to provide the device parameters to a host, or to use the parameters itself, the device needs to store these device parameters. Devices typically have a small amount of storage such as ROM available. However, because the device parameters may take up a relatively large space, as well as other reasons, storing the device parameters in a portion of ROM that will be used for other purposes may not be desirable. Another option is to add storage such as an EEPROM to store device parameters. However, adding an EEPROM to a device adds considerable expense.

SUMMARY

Technology is disclosed that provides device parameters in an efficient manner.

One embodiment includes a non-volatile storage device having non-volatile memory, a first controller, and a second controller. The first controller communicates using a first protocol on a first interface that provides external access to the non-volatile storage device. The second controller communicates using a second protocol on a second interface that provides external access to the non-volatile storage device. The second protocol is different from the first protocol. In response to a request from the first controller, the second controller retrieves device parameters from the non-volatile memory and provides the retrieved parameters to the first controller. The device parameters are specific to the non-volatile storage device.

In one embodiment, the first controller is a Universal Serial Bus (USB) card reader controller and the second controller is a Secure Digital (SD) controller. The second controller might also be a CompactFlash (CF) controller, a MemoryStick controller, or a different type of controller that is able to provide external access to the non-volatile memory. Examples of device parameters are USB descriptors, which may include a vendor ID, a product ID, and strings that describe the manufacturer, the product, and the device's serial number ("product strings"). The first controller provides the device parameters over the first interface during enumeration of the non-volatile storage device on the first interface. The parameters can be settings for the first controller to offset semiconductor process variations, or other data.

One embodiment includes a non-volatile storage device comprising non-volatile memory, a first processor that communicates over an interface that provides external access to the non-volatile memory using a first protocol, and a second processor that implements a set of vendor specific commands that is permitted by a second protocol that is different from the first protocol. The first processor issues a first command of the second protocol to the second processor to cause the second processor to enter a vendor specific mode of the second protocol. The first processor issues one or more vendor specific commands of the vendor specific command set to the second processor to request that the second processor provide parameters that pertain to the non-volatile storage device to the first processor. The second processor retrieves the parameters from the non-volatile memory if the second processor receives the one or more vendor specific commands while in the vendor specific mode. The second processor provides the retrieved parameters to the first processor. The first processor may be a card reader controller. The second processor may be a memory controller such as a Secure Digital controller, CompactFlash controller, or MemoryStick controller.

One embodiment includes a method for providing device parameters that are specific to a non-volatile storage device that has a first controller and a second controller. The method includes the second controller requesting the device parameters from the first controller using a first communication protocol, the second controller retrieving the device parameters from non-volatile memory on the non-volatile storage device, the first controller providing the retrieved parameters to the second controller using the first communication protocol, the first controller controlling external access to the non-volatile memory by using the first communication protocol, and the second controller controlling external access to the non-volatile memory by using a second communication protocol that is different than the first communication protocol.

One embodiment includes a method for providing device parameters that pertain to a non-volatile storage device that includes a first processor and a second processor. The method comprises the second processor issuing a command to the first processor to cause the first processor to enter a vendor specific mode of a first communication protocol, and the second processor issuing one or more vendor specific commands permitted by the first communication protocol. The one or more vendor specific commands request that the first processor provide the device parameters to the second processor. The method further comprises the first processor retrieving the device parameters from non-volatile memory on the non-volatile storage device if the first processor receives the one or more vendor specific commands while in the vendor specific mode, the second processor providing the retrieved parameters to the second processor, and the second processor providing the retrieved parameters to a host over an interface that is controlled by the second processor. The second processor provides the parameters to the host using a second communication protocol that is different from the first communication protocol.

DETAILED DESCRIPTION

Architectural Overview

Figure 1:
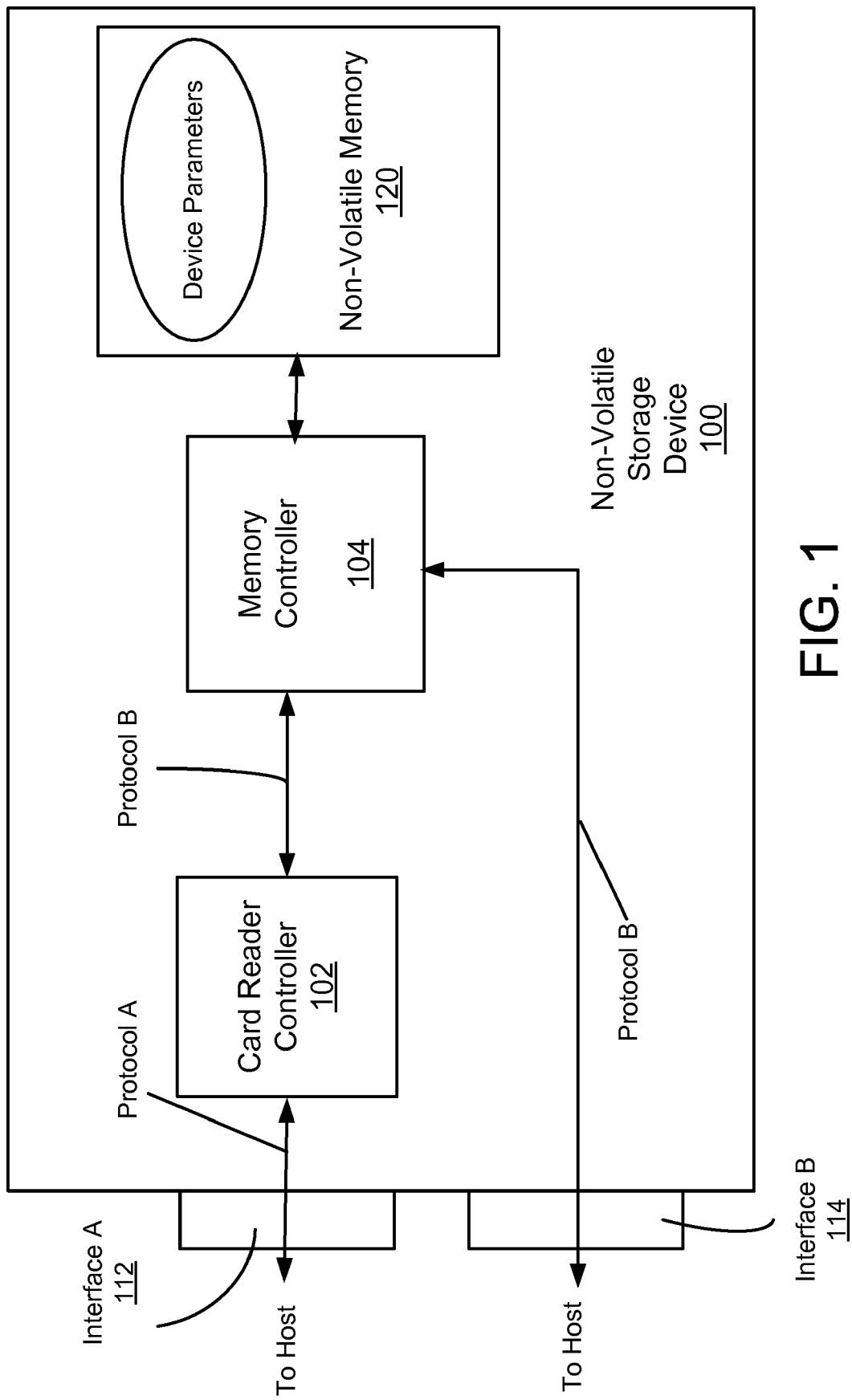
FIG. 1 depicts one embodiment of a non-volatile storage device having a first controller that requests device parameters from a second controller.

FIG. 1 depicts one embodiment of a non-volatile storage device 100 that has a card reader controller 102 and a memory controller 104 that provide external access to the non-volatile memory 120 through different external interfaces. In one embodiment, device 100 is a portable memory card that can be inserted into various host electronic devices. For example, the device 100 might be inserted into a digital camera to store digital images in the non-volatile memory 120. The device 100 might also be inserted into a handheld computer, a personal digital assistant (PDA), a global positioning satellite (GPS) device, a music player, a camcorder, a Smartphone, etc. The device 100 can also be connected to an external host via a cable, such as a USB cable. Device 100 can be used to store digital data from or transfer digital data to a computer system such as a personal computer.

Device 100 can be electrically connected to an external host through either interface A 112 or interface B 114. Interface A 112 and interface B 114 are compliant with form factors of different protocols. For example, interface A 112 may be compliant with a USB form factor, whereas interface B 114 may be compliant with an SD form factor. A USB interface has four pins (Power, D+, D−, and ground). An SD interface has nine pins (clock, command, 4×Data, and 3×Power). However, interfaces 112, 114 could be other than USB and SD.

When connected through interface A 112, the external host communicates with the card reader controller 102 using Protocol A in order to access to non-volatile memory 120. When connected through interface B 114, the external host communicates with the memory controller 104 using Protocol B in order to access to the non-volatile memory 120.

In one embodiment, interface B 114 is used when inserting the device 100 into a host electronic device. The overall shape of the device 100 has a form factor that allows the device 100 to be inserted into a slot of the host electronic device, and interface B 114 has a form factor that allows proper electrical contact to allow communication with the host device. Examples of different form factors include, but are not limited to, MultiMediaCard (MMC), Secure Digital (SD), miniSD, microSD, Memory Stick, and CompactFlash.

Controller 104 is referred to herein as a memory controller 104 because it has direct access to the non-volatile memory 120 (e.g., flash memory) and directly controls data transfers in and out of the non-volatile memory 120. The memory controller 104 could be a Secure Digital controller, a Memory Stick controller, a CompactFlash controller, or another type of memory controller 104 that is able to provide access of non-volatile memory 120 (such as flash memory) to an external host. In one embodiment, the memory controller 104 provides encryption capabilities for protected content to ensure secure distribution of copyrighted material, such as digital music, video, and eBooks. The memory controller 104 uses protocol B to communicate with the external host. Protocol B can be the Secure Digital (SD) protocol, CompactFlash (CF) protocol, Memory Stick protocol, or other protocol used to access non-volatile memory (e.g., flash memory).

The card reader controller 102 and the external host communicate using protocol A. As an example, protocol A might be a Universal Serial Bus (USB) protocol. However, protocol A could be another protocol such as an IEEE 1394 (e.g., FireWire) protocol. Note that the card reader controller 102 does not have direct access to the non-volatile memory 120. In order for the card reader controller 102 to indirectly access the non-volatile memory 120, the card reader controller 102 communicates with the memory controller 104 using protocol B. Thus, the card reader controller 102 and the memory controller 104 are connected by a physical interface that allows data transfer in accordance with Protocol B. For example, the physical interface has lines for clock, command, and data in accordance with the SD protocol or another memory protocol.

The card reader controller 102 allows access to the memory 120 to a host that either does not have an interface such as interface B 114 and/or is unable to communicate using protocol B. For example, a user may wish to transfer data from the device 100 to a personal computer that does not have an SD interface. Most computers do have USB interfaces; therefore, a card reader controller having a USB interface may be used. Note that having the card reader controller 102 embedded onto the device 100 alleviates any need for an external card reader controller 102.

When a user connects the non-volatile storage device 100 to the host through interface A 112, the host requests device parameters in order to enumerate the non-volatile storage device 100. For example, the host enumerates the device 100 in accordance with a USB protocol, although it could be another protocol. The device parameters include USB descriptors. USB descriptors include a vendor ID, a product ID, and possibly strings (manufacturer ID string, product ID string, serial number sting), etc. The device parameters are stored in a secure location in the non-volatile memory 120. For example, the non-volatile memory 120 has a secure partition or "secret area" that is not accessible from outside of the device 100. Thus, the parameters are stored in a location in the non-volatile memory 120 that is not addressable by the host.

In order to obtain the device parameters, the card reader controller 102 requests the memory controller 104 to obtain the device parameters from the non-volatile memory 120. In response, the memory controller 104 retrieves the device parameters and provides them to the card reader controller 102.

Note that use of the non-volatile memory 120 to store the device parameters alleviates any need for using other storage on the non-volatile storage device 100 for storing the device parameters. For example, there is no need for an EEPROM on device 100 to store USB descriptors. As another example, there is no need to use storage within the card reader controller 102 to store USB descriptors. If USB descriptors were to be stored within the card reader controller 102, such storage might be performed when the card reader controller 102 is manufactured (although storing parameters in an EEPROM might be performed at any time).

Note that the card reader controller 102 might be capable of being used for many different products and vendors. As such, the PID, VID, and product strings are dependent on what product the card reader controller 102 will be used in and what vendor is going to sell the non-volatile storage device 100 (which is not necessarily the seller of the card reader controller 102). Thus, manufacturing of the card reader controller 102 may be simplified by avoiding storing of device parameters therein. Further, since each non-volatile storage device 100 is assigned a unique serial number, each card reader controller 102 should be associated with a different serial number. However, at the time the card reader controller 102 is manufactured, a suitable serial number for the non-volatile storage device 100 may not be known or may be difficult to determine. For at least these reasons, it may be difficult to place the serial number of the non-volatile storage device 100 into the USB card reader controller 102 when the card reader controller 102 is manufactured.

FIG. 1 shows card reader controller 102 and memory controller 104 communicating using Protocol B. In one embodiment, the card reader controller 102 and the memory controller 104 communicate through a set of vendor specific commands in order for the card reader controller 102 to obtain the device parameters from the non-volatile memory 120. A vendor specific command is a configurable command, within Protocol B, whose format and behavior is not defined by Protocol B. Rather, the format and behavior can be defined to accommodate special purposes.

While an example of providing USB descriptors has been used, other device parameters stored in the non-volatile memory 120 can be provided to the card reader controller 102. For example, the device parameters may be used to offset process variations that occur when manufacturing a component in the device 100.

Overview of Process of Providing Device Parameters

Figure 2:
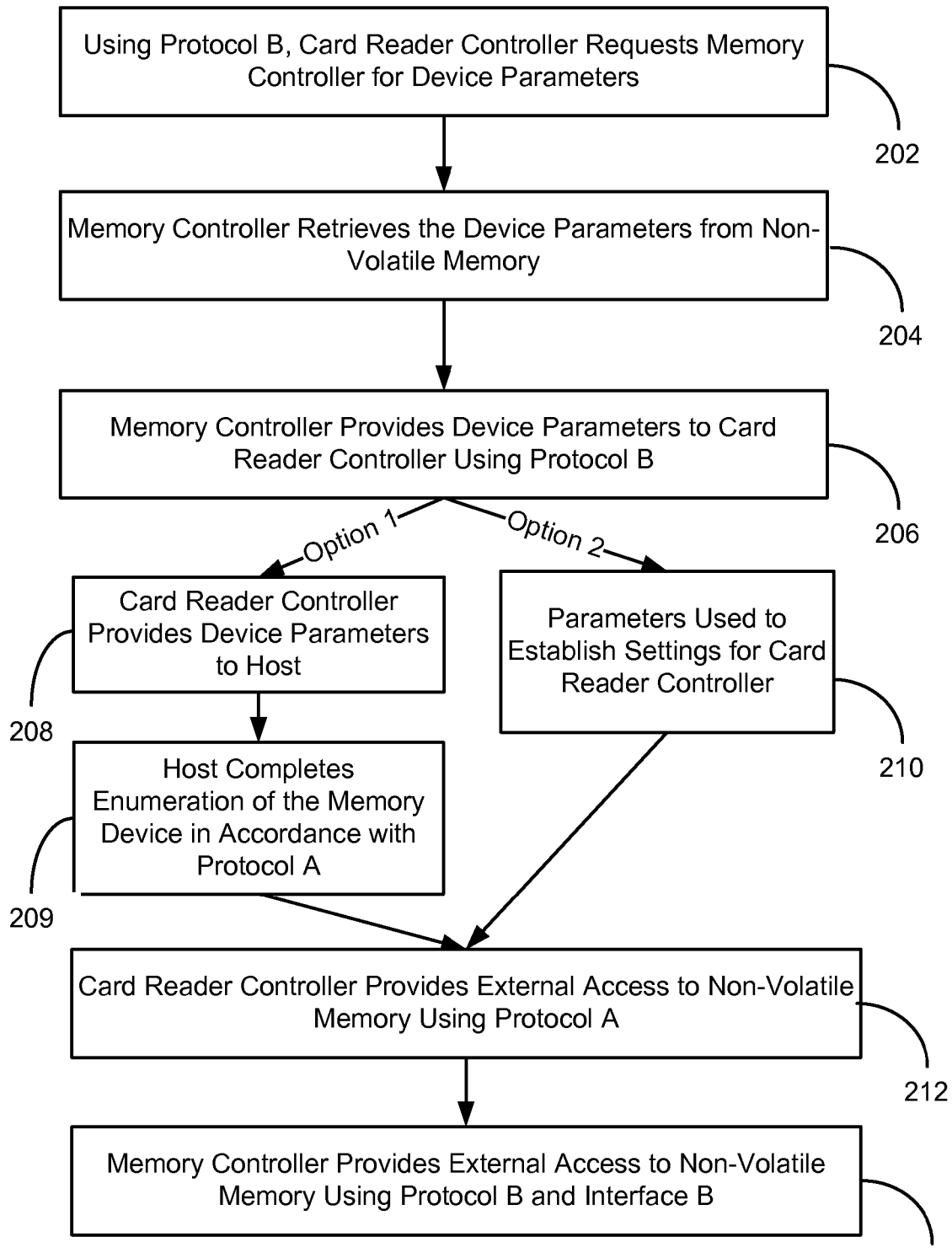
FIG. 2 depicts one embodiment of a process of providing device parameters.

FIG. 2 depicts one embodiment of a process 200 of providing device parameters. Process 200 will be discussed in reference to the example non-volatile storage device 100 of FIG. 1. However, process 200 is not limited to the example storage device 100 and the example storage device 100 is not limited to process 200. In step 202, the card reader controller 102 uses protocol B to request the device parameters from the memory controller 104. Typically, the card reader controller 102 requests the parameters upon detecting a power-on-reset (POR).

In step 204, the memory controller 104 retrieves the device parameters from the non-volatile memory 120. In step 206, the memory controller 104 provides the retrieved device parameters to the card reader controller 102 using protocol B.

In step 208 (option 1), the card reader controller 102 provides the parameters to the external host using protocol A. In step 209, the external host uses the parameters to complete an enumeration process in accordance with protocol A. For example, the host selects a device driver for device 100 and establishes a communication channel with device 100. The host also indicates that the device 100 has been plugged into the host. For example, the host adds the device 100 to a list of storage devices and networks that are available to the host computer system. Also, if a user requests properties of the device 100, the host displays information based on the product strings.

However, providing the parameters to the host is not a requirement. In step 210 (option 2), the parameters are used to establish settings for the card reader controller 102. As an example, the settings can be used to offset semiconductor process variations. In one embodiment, the parameters are used to program one or more registers in the card reader controller 102. The values in the registers are used to adjust a component in the card reader controller 102 to offset the process variations. For example, the value of a resistor can be adjusted based on the device parameters stored in the registers.

In step 212, the card reader controller 102 provides the host access to the non-volatile memory 120 using protocol A. For example, the card reader controller 102 communicates with the host using a USB protocol to allow the host to transfer data to or from the non-volatile memory 120. In this example, the host uses the USB protocol to request the card reader controller 102 for data from the memory 120. The card reader controller 102 generates a suitable SD command to send to the memory controller 104. The memory controller 104 returns the requested data to the card reader controller 102 using the SD protocol. Then, the card reader controller 102 transfers the data to the host using the USB protocol. Further details of step 212 are described in connection with process 600 of FIG. 6.

In step 214, memory controller 104 provides external access to the non-volatile memory 120 through interface B using protocol B. For example, memory controller 104 provides access to the non-volatile memory 120 through interface B using the SD protocol, a CompactFlash protocol, or a Memory Stick protocol. Note that typically only one of the interfaces controllers 102, 104 communicates with the host at one time. Step 214 may occur prior to steps 202-212. For example, prior to step 202, the user could connect the device 100 to a digital camera, camcorder, PDA, other electronic device through interface B 114 to allow digital data to be transferred to non-volatile memory 120. Memory controller 104 uses Protocol B to communicate with the host in step 214. In this example, the user transfers the digital data to the host in step 212. Further details of step 214 are described in connection with process 600 of FIG. 6.

Example Sequence Upon Connecting to Host Using Interface A

Figure 3:
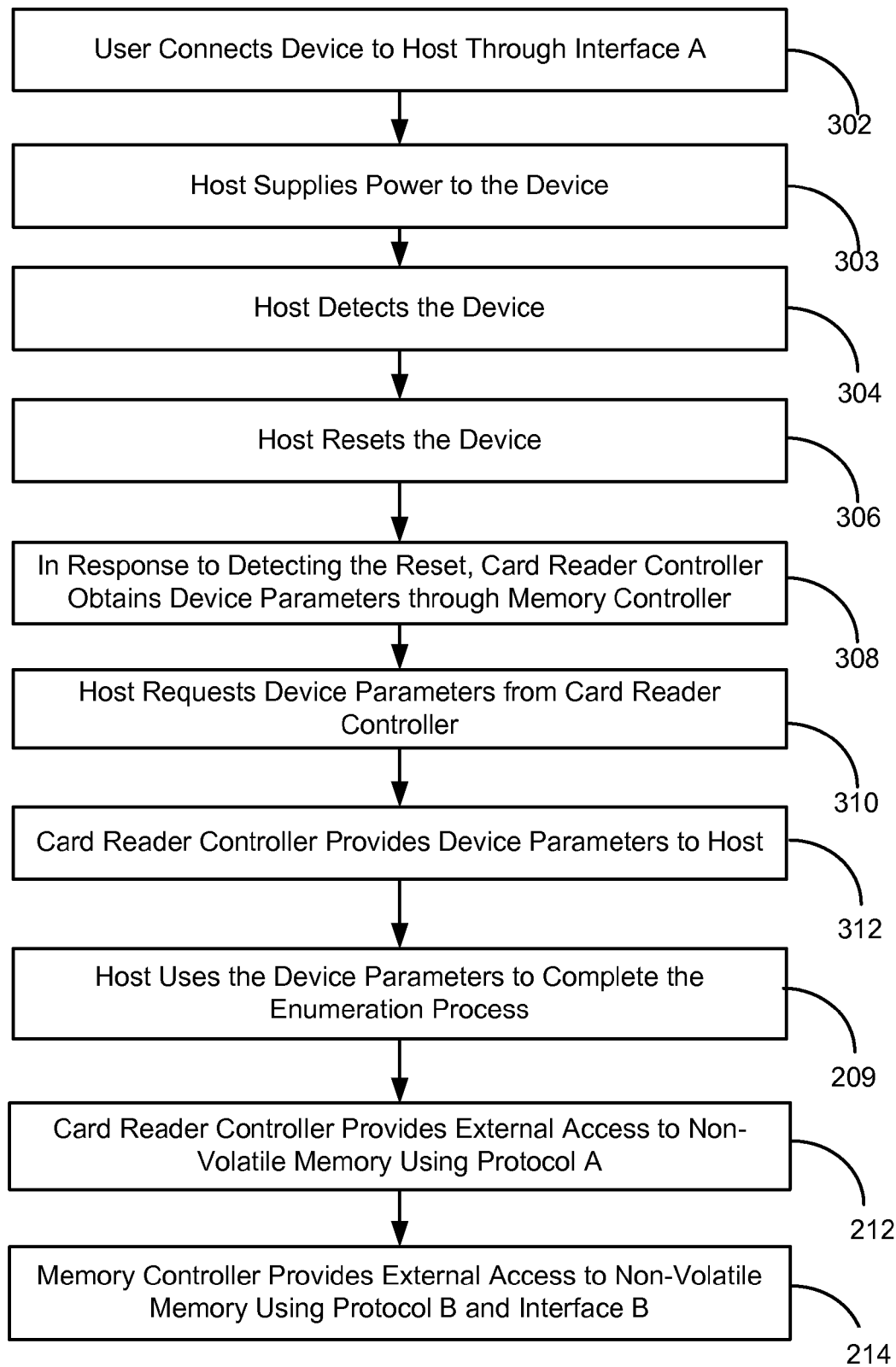
FIG. 3 depicts one embodiment of a process of providing device parameters to a host.

As previously discussed, when a user connects the device 100 to a host through interface A 112, the host requests device parameters. FIG. 2 describes a general sequence of steps that occur after the user connects the device 100 to a host. The process 300 of FIG. 3 depicts details of interactions between the host and card reader controller 102 in one embodiment of providing device parameters to a host. The steps below are a typical sequence of events that occur during enumeration when interface A 112 is a USB interface. The steps of process 300 are described in this order for convenience of discussion; therefore, the steps could take place in a different order. Furthermore, some steps of process 300 may not complete before the next step begins.

In step 302, a user connects the non-volatile storage device 100 to an external host through interface A 112 (e.g., USB interface). If the host is already powered on, the host supplies power to the device 100, in step 303. If the host is not powered on when the device 100 is connected, the external host supplies power to the device 100 when the host powers on, in step 303.

In step 304, the host detects the device 100. To detect the device 100, the host monitors voltages on signal lines (D+ and D−) on the host port to which the device 100 is connected. The host has a pull-down resistor of 14.25 to 24.8 K ohms on each of the host port's two signal lines. The device 100 has a pull-up resistor of 900 to 1575 ohms on either the D+ signal line for a full-speed device or the D− signal line for a low-speed device. When the device 100 is plugged into a host port, the device's pull-up resistors bring the device's signal line (either D+ or D−) high, enabling the host to detect the device 100.

In step 306, the host resets the device 100. To reset the device 100, the host sets both signal lines (D+ and D−) to logic low. This differs from normal operation in which the signal lines have opposite logic values. The host maintains the logic low values for at least 10 milliseconds.

Figure 4:
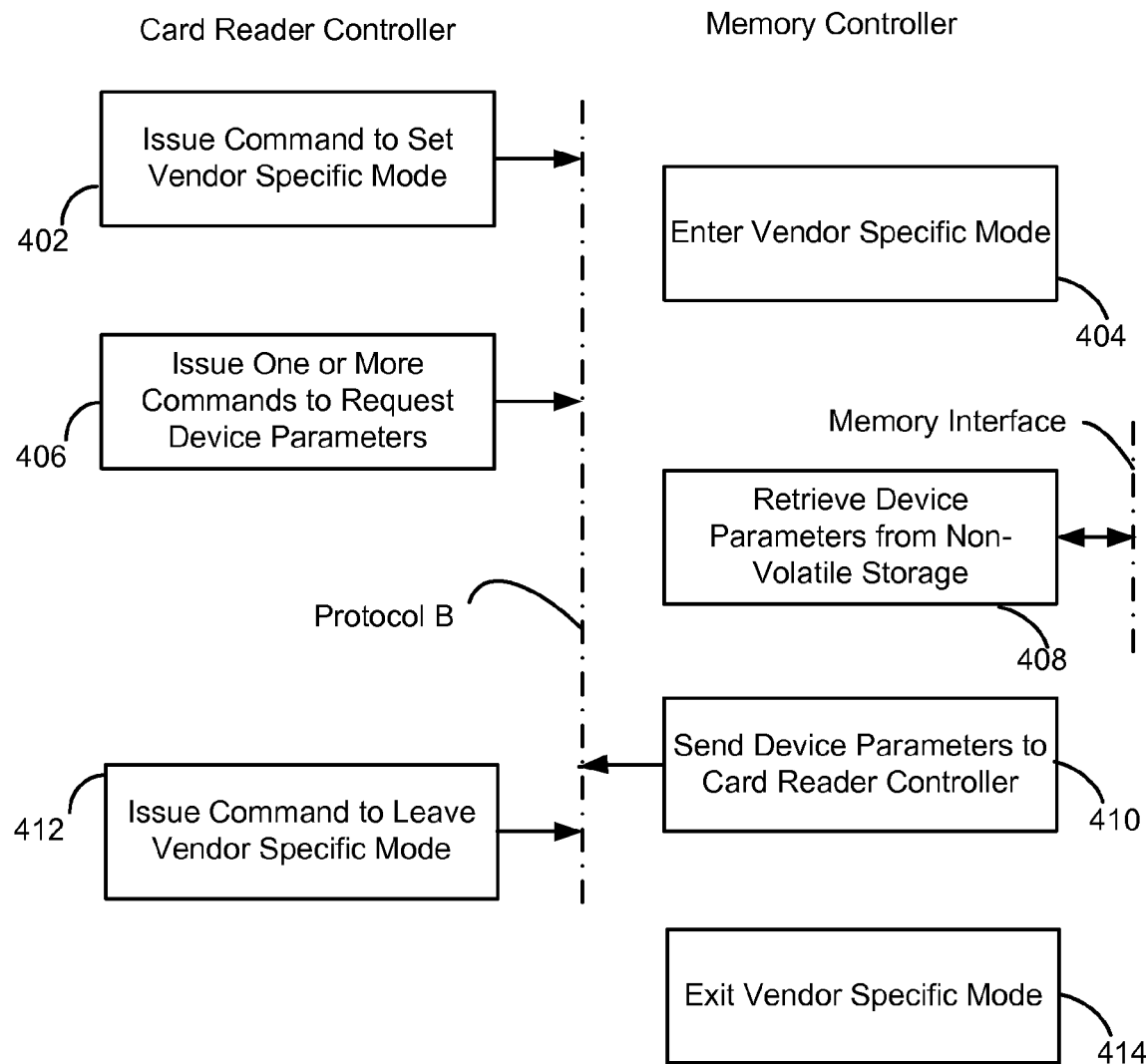
FIG. 4 depicts one embodiment of a command flow using vendor specific commands to retrieve device parameters.

In step 308, in response to detecting the reset, the card controller 102 obtains the device parameters from the memory controller 104 in anticipation that the host will request the parameters. In one embodiment, process 400 of FIG. 4 is used to obtain the device parameters. Step 308 does not necessarily complete prior to step 310 beginning.

In step 310, the host requests the device parameters from the card reader controller 102 using protocol A. Step 310 may involve the host sending multiple requests to the device 100. For example, the host sends a first Get_Descriptor request of the USB protocol to learn the maximum packet size the device 100 will send, and the host sends a second Get_Descriptor request to obtain the device descriptors. In step 310, the host may also request the device 100 for configuration descriptors which describe information about a specific device configuration, interface descriptors which describe a specific interface within a configuration, and endpoint descriptors which describe endpoints used for an interface. The host may also request product string descriptors which describe the device manufacturer, the product, and the device's serial number.

In step 312, the card reader controller 102 provides the device parameters to the host using protocol A. The card reader controller 102 responds to each Get_Descriptor request by returning the entire data structure containing USB device descriptors, although the host ignores most of the data returned in response to the first Get_Descriptor request. Table 1 includes an example data structure for USB device descriptors returned by the device 100. The USB device descriptors include a vendor identifier (VID), a product identifier (PID), and a device release number at offsets 8, 10 and 12. The data structure has fields for indexes to strings at offsets 14, 15, and 16.

TABLE 1

| Offset | Field | Size | Value | Description |
| --- | --- | --- | --- | --- |
| 0 | bLength | 1 | Number | Size of this descriptor in bytes |
| 1 | bDescriptorType | 1 | Constant | DEVICE Descriptor Type |
| 2 | bcdUSB | 2 | BCD | USB Specification Release Number |
| 4 | bDeviceClass | 1 | Class | Class code |
| 5 | bDeviceSubClass | 1 | SubClass | Subclass code |
| 6 | bDeviceProtocol | 1 | Protocol | Protocol code |
| 7 | bMaxPacketSize0 | 1 | Number | Maximum packet size for endpoint zero |
| 8 | idVendor | 2 | ID | Vendor ID |
| 10 | idProduct | 2 | ID | Product ID |
| 12 | bcdDevice | 2 | BCD | Device release number in binary-coded decimal |
| 14 | iManufacturer | 1 | Index | Index of string descriptor describing manufacturer |
| 15 | iProduct | 1 | Index | Index of string descriptor describing product |
| 16 | iSerialNumber | 1 | Index | Index of string descriptor describing the device's serial number |
| 17 | bNumConfigurations | 1 | Number | Number of possible configurations |

If the host requests string descriptors, the device 100 provides the string descriptors in step 312. Table 2 is an example data structure that the device returns in response to a request for what languages of string descriptors the device 100 supports. The fields at offsets 2-N are codes that indicate what languages the device supports.

TABLE 2

| Offset | Field | Size | Value | Description |
|---|---|---|---|---|
| 0 | bLength | 1 | N + 2 | Size of this descriptor in bytes |
| 1 | bDescriptorType | 1 | Constant | STRING Descriptor Type |
| 2 | wLANGID[0] | 2 | Number | LANGID code zero |
| ... | ... | ... | ... | ... |
| N | wLANGID[x] | 2 | Number | LANGID code x |

Table 3 depicts a data structure that is returned by the device 100 in response to a request for a string at a specific offset. For example, the host requests the string based on the offsets provided by the device 100 in the device descriptors.

TABLE 3

| Offset | Field | Size | Value | Description |
|---|---|---|---|---|
| 0 | bLength | 1 | Number | Size of this descriptor in bytes |
| 1 | bDescriptorType | 1 | Constant | STRING Descriptor Type |
| 2 | bString | N | Number | UNICODE encoded string |

After the host receives the device parameters, the host completes enumeration as described in step 209 of process 200. The card reader controller 102 then provides external access to the non-volatile memory 120, as described in step 212 of process 200 and process 600. Further, the memory controller 104 provides external access to the non-volatile memory 120, as described in step 204 of process 200 and process 600.

Example Vendor Specific Commands

In one embodiment, the card reader controller 102 requests the device parameters from the memory controller 104 using one or more vendor specific commands that are permitted by protocol B. This section provides an example of vendor specific commands for use with the SD protocol. The CMD6 of the SD protocol is a switch function command that is used to switch or expand memory card functions. The switch function command can be used to establish the command set that the memory card recognizes. That is, the memory card can be switched between supporting a standard command set and a vendor specific command set. In the SD protocol, CMD34-37, CMD50, and CMD57 are set aside as vendor specific commands. When the device 100 is not in the vendor specific mode, the vendor specific commands are not recognized by the device 100 and are considered illegal commands.

The following description illustrates how CMD34 and CMD35 may be used to retrieve parameters. For convenience of discussion, an example in which a card reader controller 102 issues the vendor specific commands to a memory controller 104 will be used.

CMD35

In one embodiment, CMD35 is used to indicate that a request for the device parameters is being made. CMD35 is issued from the card reader controller 102 to the memory controller 104. This command may have a behavior that is similar to an SD command that writes a single block, although the memory controller 104 does not write the arguments to memory 120. As an example, CMD35 may have a behavior that is similar to CMD24 of the SD protocol, which is a command to write a single block. Table 4 depicts example arguments for CMD35, but other values could be used. The arguments define what parameters are being requested. For example, the arguments might indicate that USB descriptors or other device parameters such as those used to offset process variations are being requested. The arguments could specify which USB descriptors, such as device descriptors, configuration descriptors, or string descriptors, are being requested. In the following example, the block has 512 bytes, but the block could have a different number of bytes.

TABLE 4

| Byte 0: | 0x10 |
|---|---|
| Byte 1: | 0x40 |
| Bytes 2-511 | 0 |

In one embodiment, the memory controller 104 does not respond to the card reader controller 102 upon receiving CMD35. The memory controller 104 may retrieve the device parameters upon receiving CMD35, but does not transfer the device parameters until receiving CMD34. In one embodiment, if the arguments in CMD35 are incorrect, then the memory controller 104 response for CMD34 is "General Error" and no device parameters are sent to the card reader controller 102.

CMD34

In one embodiment, CMD34 is used to cause the memory controller 104 to transfer the device parameters to the card reader controller 102. This command may be a request to read a single block of data. This command may have a behavior that is similar to an SD command that reads a single block. For example, CMD34 may have a behavior that is similar to a CMD17 of the SD protocol, which is a command to read a single block. The memory controller 104 (Firmware and ASIC) ignores the argument of CMD34. Table 5 depicts an example data pattern definition for data returned by the memory controller 104 in response to receiving CMD34. For example, the memory controller 104 transfers such data to the card reader controller 102.

TABLE 5

| Byte 0 ... 19 | device serial number |
|---|---|
| Byte 20 ... 34 | product string (ASCII character string) |
| Byte 35 ... 36 | Vendor-ID |
| Byte 37 ... 38 | Product-ID |
| Byte 39 ... 51 | 0 |

In one embodiment, if the card reader controller 102 sends CMD34 without sending CMD35 first, then the memory controller's 104 response is "General Error".

Table 6 depicts an example command sequence.

TABLE 6

| CMD6 | Set Vendor Specific Mode |
|---|---|
| CMD35 | Query for device parameters |
| CMD34 | Read the data requested in CMD35 |
| CMD 6 | Exit Vendor Specific Mode |

Example Command Flow Using Vendor Specific Commands to Retrieve Device Parameters FIG. 4 depicts one embodiment of a command flow 400 using vendor specific commands to retrieve device parameters. Process 400 is initiated when the card reader controller 102 determines that device parameters will be needed, such as upon detecting a reset. The command flow 400 will be discussed in reference to the device 100 in FIG. 1, although the command flow 400 is not so limited. In step 402, the card reader controller 102 issues a command of Protocol B to the memory controller 104 to set the memory controller 104 into a vendor specific mode. In one embodiment, the card reader controller 102 issues a command that complies with the SD protocol. As a particular example, the card reader controller 102 may issue a CMD6 of the SD protocol. However, in another embodiment, the command complies with a protocol other than the SD protocol.

In step 404, the memory controller 104 enters the vendor specific mode. In the vendor specific mode, the memory controller 104 will support a set of vendor specific commands, as well as standard commands. An example of vendor specific commands for use with the SD protocol is provided herein under the heading "example vendor specific commands". In another embodiment, the vendor specific commands are a different protocol than the SD protocol.

In step 406, the card reader controller 102 issues one or more commands to the memory controller 104 to request device parameters. In one embodiment, the commands are vendor specific commands that are permitted by Protocol B. The example CMD34 and the example CMD35 discussed under the heading "example vendor specific commands" may be used.

In step 408, the memory controller 104 retrieves the device parameters from non-volatile memory 120. The device parameters may be USB descriptors. In step 410, the memory controller 104 sends the device parameters to the card reader controller 102 using Protocol B. In one embodiment, the memory controller 104 sends the device parameters using a format that complies with the set of vendor specific commands. An example format is presented under the heading "example vendor specific commands".

In step 412, the card reader controller 102 issues a command of Protocol B to the memory controller 104 to request that the memory controller 104 exit the vendor specific mode. As an example, the card reader controller 102 issues a CMD6 of the SD protocol. In step 414, the memory controller 104 exits the vendor specific mode.

The command flow in FIG. 4 discusses an example in which the memory controller 104 is an SD controller. However, the memory controller 104 is not required to be an SD controller. Note that the types of commands may be different and there may be some variations to the command flow 400 if other memory controllers 104 are used. For example, for some protocols it may not be necessary to place the memory controller 104 into a vendor specific mode in order to use vendor specific commands. In addition, the commands that request the device parameters from the memory controller 104 do not necessarily have to be vendor specific commands.

Example of Command Processing

Figure 5:
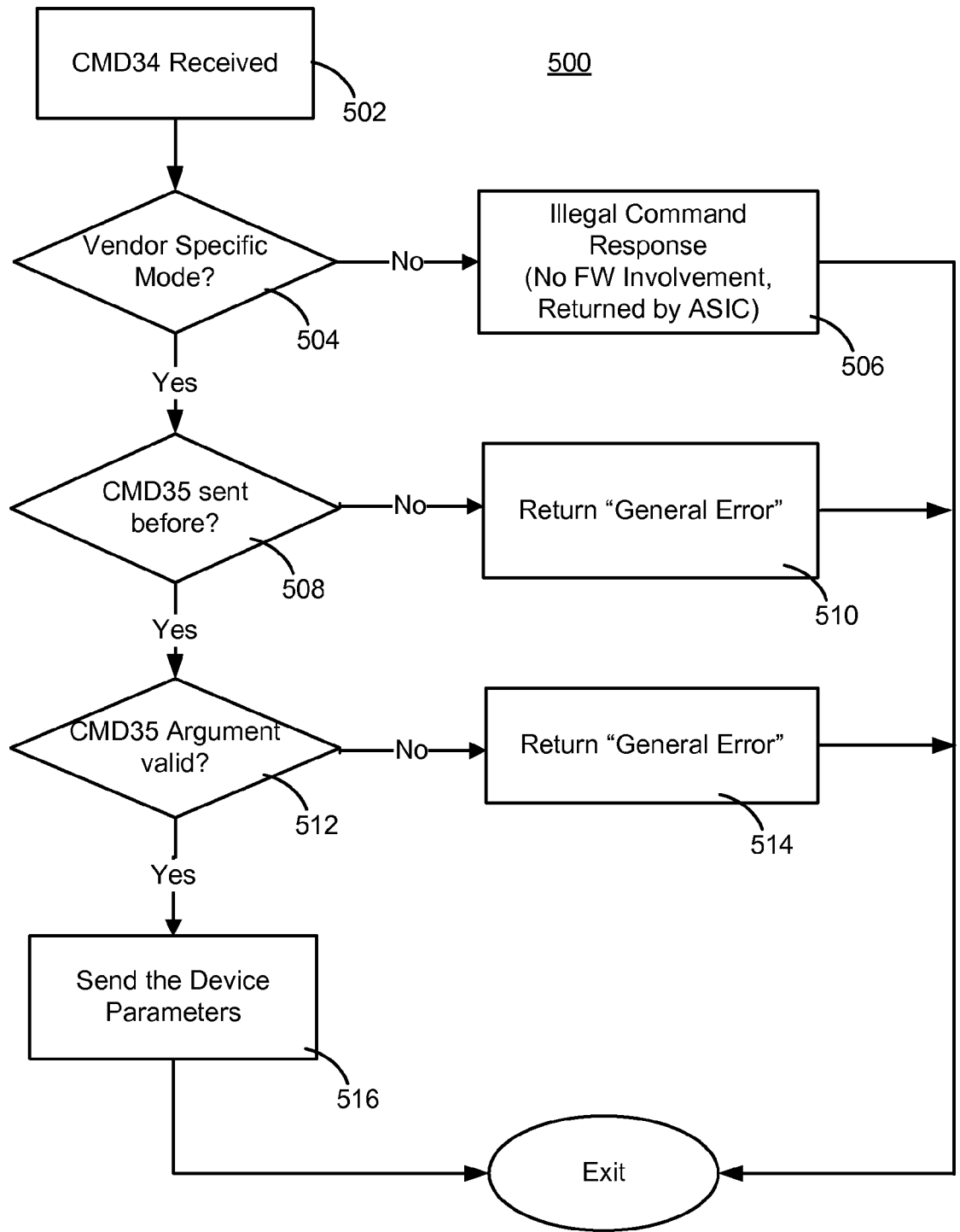
FIG. 5 depicts one embodiment of command flow using vendor specific commands to retrieve device parameters.
Figure 7:
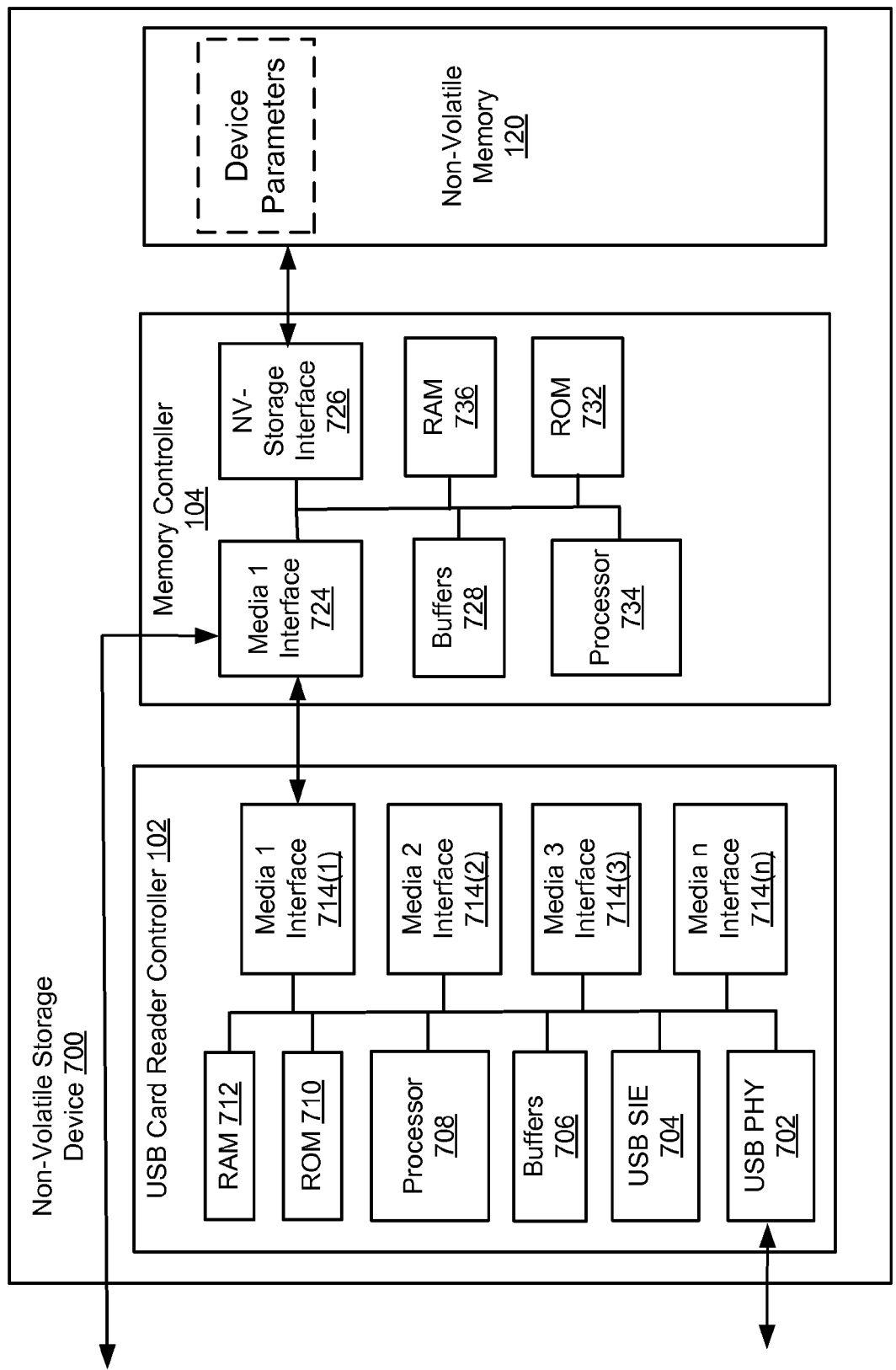
FIG. 7 depicts an example non-volatile storage device in which embodiments of the present invention may be practiced.

FIG. 5 depicts one embodiment of command processing 500 of example vendor specific commands. In particular, the command processing 500 describes actions taken by the recipient in response to receiving the example CMD34 discussed herein. For convenience of discussion, the memory controller 104 will be the recipient. In step 502, the memory controller 104 receives CMD34. If the memory controller 104 determines that it is not in the vendor specific mode, then the memory controller 104 responds that an illegal command has been received (steps 504, 506). In one embodiment, firmware on the memory controller 104 that is programmed to implement the vendor specific commands is not involved with the response. Rather, the response is handled by an ASIC such as memory controller media interface (FIG. 7, 724).

If the memory controller 104 is in the vendor specific mode upon receiving CMD34, then the memory controller 104 determines whether CMD35 has been previously received (step 508). This determination may be made by firmware on the memory controller 104. If CMD35 has not been previously received, then the memory controller 104 responds with a "general error" in step 510.

If CMD35 was previously received, then the memory controller 104 determines whether the arguments for CMD35 are valid, in step 512. If the arguments are not valid, then the memory controller 104 returns a "general error", in step 514.

If the arguments to CMD35 are valid, then the memory controller 104 transfers a sector (e.g., 512 bytes) of data containing the device parameters, in step 516. This ends the command processing 500.

Figure 6:
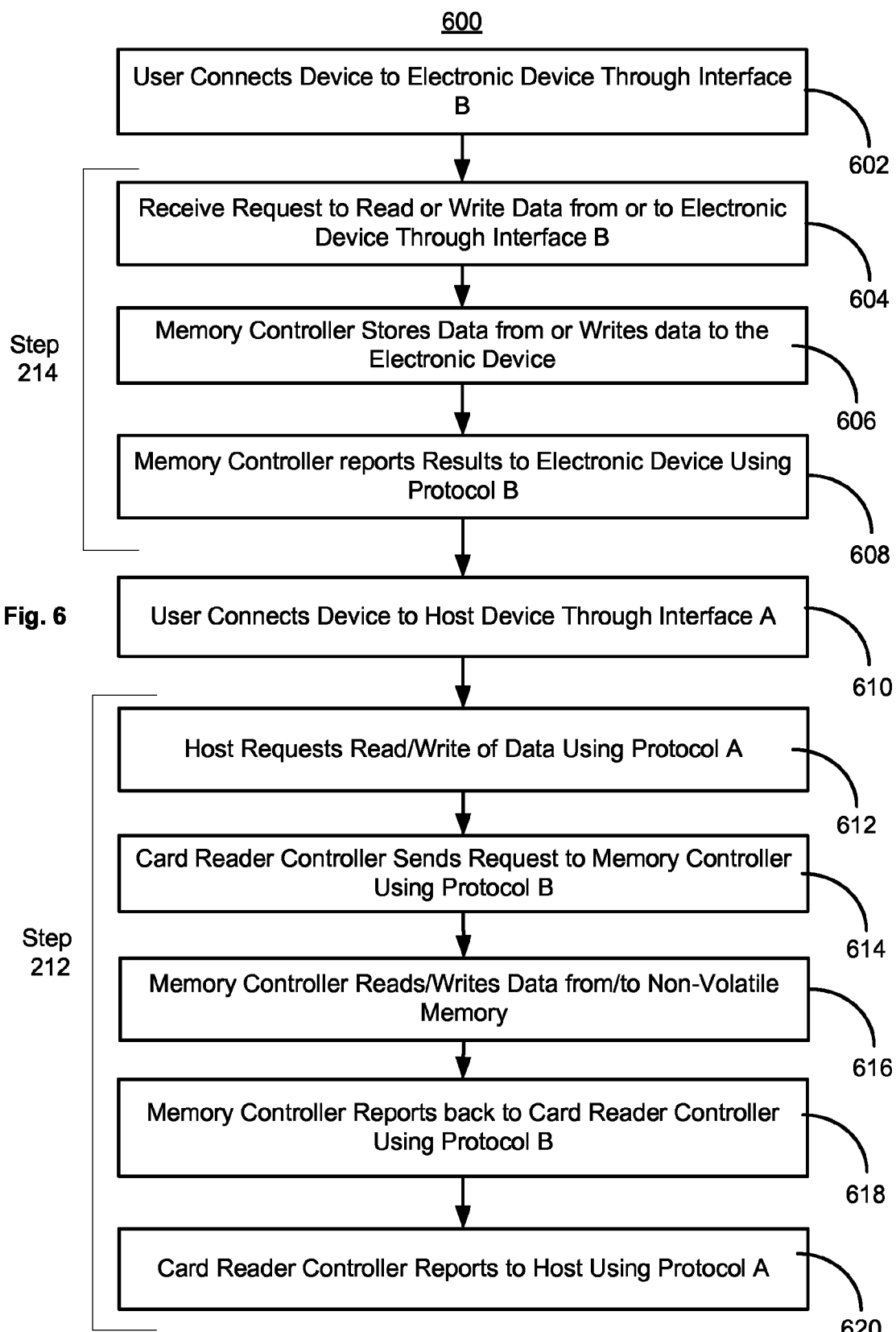
FIG. 6 depicts one embodiment of transferring data to and from a non-volatile storage device using different protocols.

Example of Transferring Data to and from the Non-Volatile Storage Device Using Different Protocols FIG. 6 depicts details of one embodiment of a process 600 of transferring data to a from device 100 using different protocols. In step 602, the user connects the device 100 to a host electronic device through interface B 114. For example, the user inserts the non-volatile storage device 100 into a digital camera, camcorder, PDA, music player, etc.

In step 604, device 100 receives a request to transfer data between non-volatile memory 120 and the host through interface B 114. As an example, the host issues one or more commands of the SD protocol to request data transfer from a digital camera to the non-volatile memory 120. As another example, the request may be to transfer data from the non-volatile memory 120 to a music player.

In step 606, the memory controller 104 transfers data between non-volatile memory 120 and the host. As an example, the memory controller 104 receives one or more data blocks over interface B 114 that conform to the SD protocol are stores data from the blocks into non-volatile memory 120.

In step 608, the memory controller 104 reports results to the host using protocol B. For example, in the SD protocol, the recipient sends a response to the host as an answer to a previously received command. Thus, the memory controller 104 issues a response to each SD command received from the host. Then, the host displays a message to a user indicating the data transfer is complete so that the user can remove the device 100 from the host.

In step 610, the user connects the non-volatile storage device 100 to a host through interface A 112. As an example, the user connects device 100 to a USB port of a personal computer to download digital photographs. As another example, the user plans to transfer music files from the host to the device 100. In step 612, the host requests data transfer using Protocol A. As an example, the user interacts with an interface on a personal computer to select files to be transferred from the non-volatile memory 120. The user might also select a file from the personal computer to be transferred to the non-volatile memory 120.

In step 614, the card reader controller 102 sends a request to the memory controller 104 using Protocol B. For example, the card reader controller 102 issues a command of the SD protocol to request that one or more blocks of data be retrieved from or stored to the non-volatile memory 120.

In step 616, the memory controller 104 retrieves data from or stores data to the non-volatile memory 120. For example, one or more blocks of data are transferred between the card reader controller 102 and the memory controller 104 in accordance with the SD protocol. The memory controller 104 transfers the data to or from the non-volatile memory 120.

In step 618, the memory controller 104 reports back to the card reader controller 102 using Protocol B. For example, the memory controller 104 sends a response to each command received from the card reader controller 102 in accordance with the SD protocol.

In step 620, the card reader controller 102 reports to the host using protocol A. For example, the card reader controller 102 sends a response in accordance with the USB protocol. The host may then display a message to the user indicating that the data transfer is complete.

Example Non-Volatile Storage Device

FIG. 7 depicts an example non-volatile storage device 700 in which embodiments of the present invention may be practiced. For example, device 700 shows details of one embodiment of the card reader controller 102 and the memory controller 104. The example device 700 has a USB card reader controller 102, a memory controller 104, and non-volatile memory 120. In one embodiment, the USB card reader controller 102 and the memory controller 104 are implemented with separate integrated circuits.

In one embodiment, the USB card reader controller 102 provides for bulk only transport in accordance with the USB 2.0 Specification. The USB PHY 702 contains analog circuitry that handles low level USB protocol and signaling and shifts the clock domain of the data from the USB rate to one that is compatible with logic in the device 700. The USB PHY 702 converts analog signals to digital streams and contains a phase lock loop circuit for generating precision clocks for internal data latching.

The USB Serial Interface Engine (SIE) 704 contains USB PID and address recognition logic, and other sequencing and state machine logic to handle USB packets and transactions. The SIE 704 provides serial and parallel data conversion, packet decoding/generation, cyclic redundancy code (CRC) generation/checking, non-return-to-zero (NRZI) encoding/decoding, and bit stuffing according to a USB standard, such as the USB 2.0 standard.

The USB card reader controller 102 has media interfaces 714(1)-714(n). As examples, the media interfaces 714 could include, but are not limited to, Secure Digital (SD), Mini-Secure Digital (Mini-SD), MemoryStick™ (MS), High Speed Memory Stick (HSMS), Memory Stick PRO (MSPRO), MS Duo™, CompactFlash™ (SF), CF Ultra™, SmartMedia™ (SM), xD Picture Card™ (xD), TransFlash (SD), MultiMediaCard™ (MMC), Reduced Size MultiMediaCard (RS-MMC), NAND Flash, etc. In example device 700, only one of the media interfaces 714(1) is being used. That is, the non-volatile storage device 700 has a single memory controller 104. However, the device 700 could have multiple memory controllers 104. The buffers 706 are used to buffer data that is transferred between the USB SIE 704 and the Media Interfaces 714.

In one embodiment, the USB card reader controller 102 has firmware that implements a set of commands for obtaining device parameters from the non-volatile memory 120 through the memory controller 104. The commands may be vendor specific commands that are permitted by a communication protocol used by the media 1 interface 714(1). In one embodiment, the firmware includes instructions stored in card reader ROM 710 which, when executed on the card reader processor 708, implement the vendor specific commands. However, the instructions do not have to be stored in the card reader ROM 710. In one embodiment, the instructions are stored in the non-volatile memory 120 and loaded into the card reader controller 102 (e.g., into card reader RAM 712) when the device 700 is powered on.

The media 1 interface 714(1) of the USB card reader controller 102 is connected to the media interface 724 of the memory controller 104 to allow communication. Each media interface 714(1), 724 has a command decoder that interprets incoming commands and a response generator that generates appropriate responses to answer the incoming commands. In one embodiment, if the memory controller media interface 724 receives a vendor specific command when the memory controller 104 is not in the vendor specific mode, then the media interface 724 responds that an illegal command has been received without involvement of memory controller firmware that is designed to implement vendor specific commands.

The non-volatile memory interface 726 controls data exchange between the memory controller 104 and the non-volatile memory 120. In one embodiment, the non-volatile memory 120 comprises flash memory. The memory controller 104 has buffer 728 for buffering data during transfers between the non-volatile memory 120 and the media interface 724.

In one embodiment, the memory controller 104 has firmware that implements a set of commands for providing device parameters from the non-volatile memory 120 to the card reader controller 102. The commands may be vendor specific commands that are permitted by a communication protocol used by the media 1 interface 714(1) and the memory controller media interface 724. In one embodiment, the firmware includes instructions stored in the memory controller ROM 732 which, when executed on the memory controller processor 734, implement vendor specific commands. However, the instructions do not have to be stored in the ROM 732. In one embodiment, the instructions are stored in the non-volatile memory 120 and loaded into the memory controller 104 (e.g., into memory controller RAM 736) when the device 700 is powered on.

Example Non-Volatile Memory

Figure 8:
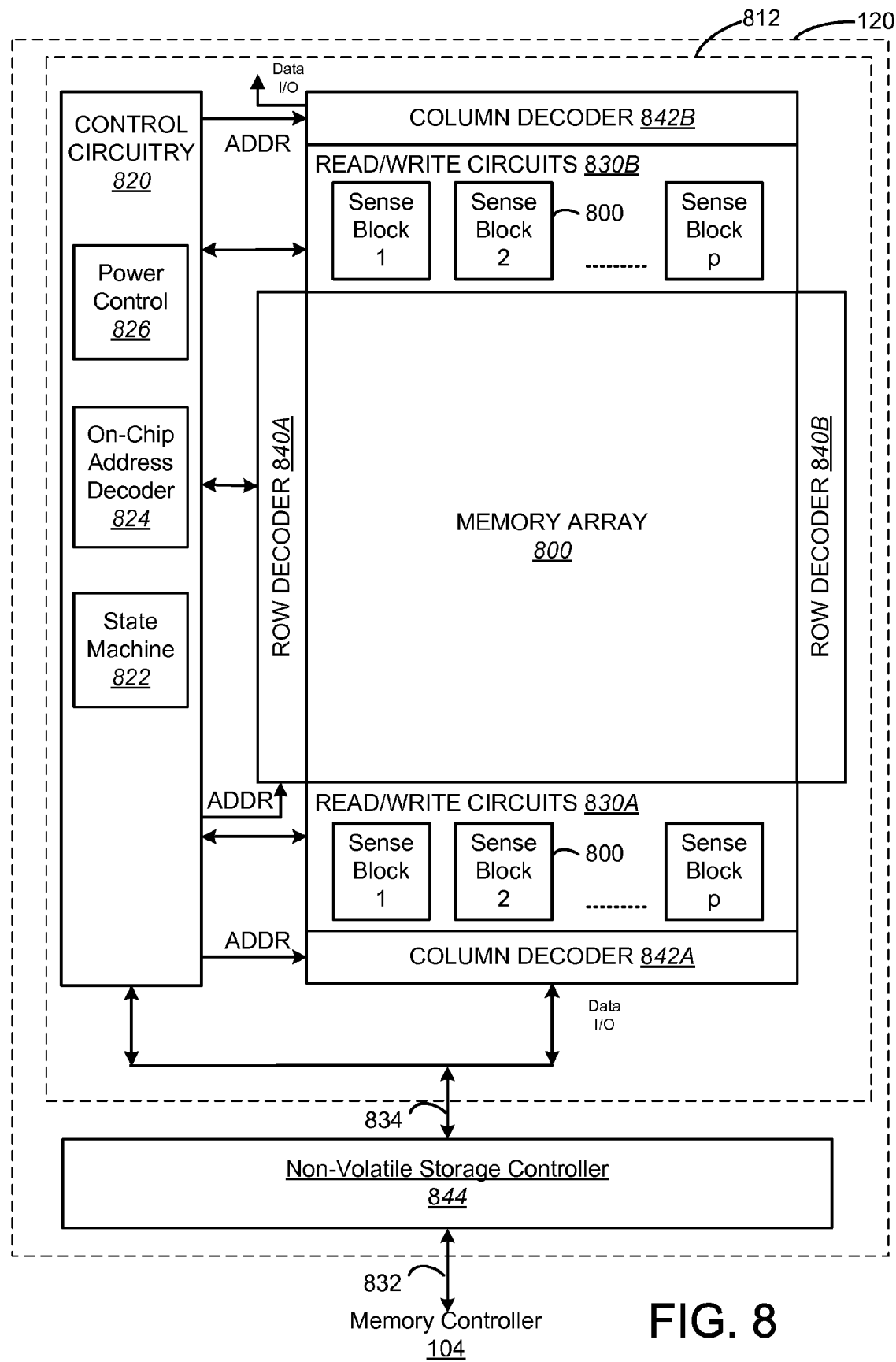
FIG. 8 illustrates an example non-volatile memory that may be used in the non-volatile storage devices of FIG. 1 and FIG. 7.

FIG. 8 illustrates an example non-volatile memory 120 that may be used in the non-volatile storage devices 100 and 700 described herein. Non-volatile memory 120 includes read/write circuits for reading and programming a page (or other unit) of memory cells (e.g., NAND multi-state flash memory) in parallel. Non-volatile memory 120 may include one or more memory die or chips 812. Memory die 812 includes an array (two-dimensional or three-dimensional) of memory cells 800, control circuitry 820, and read/write circuits 830A and 830B. In one embodiment, access to the memory array 800 by the various peripheral circuits is implemented in a symmetric fashion, on opposite sides of the array, so that the densities of access lines and circuitry on each side are reduced by half. The read/write circuits 830A and 830B include multiple sense blocks 800 which allow a page of memory cells to be read or programmed in parallel. The memory array 800 is addressable by word lines via row decoders 840A and 840B and by bit lines via column decoders 842A and 842B. Word lines and bit lines are examples of control lines. In a typical embodiment, a controller 844 is included in the same non-volatile memory 120 (e.g., a removable storage card or package) as the one or more memory die 812. Commands and data are transferred between the memory controller 104 and non-volatile storage controller 844 via lines 832 and between the non-volatile storage controller 844 and the one or more memory die 812 via lines 834.

Control circuitry 820 cooperates with the read/write circuits 830A and 830B to perform memory operations on the memory array 800. The control circuitry 820 includes a state machine 822, an on-chip address decoder 824 and a power control module 826. The state machine 822 provides chip-level control of memory operations. The on-chip address decoder 824 provides an address interface between that used by the host or a memory controller to the hardware address used by the decoders 840A, 840B, 842A, and 842B. The power control module 826 controls the power and voltages supplied to the word lines and bit lines during memory operations. In one embodiment, power control module 826 includes one or more charge pumps that can create voltages larger than the supply voltage.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

The invention claimed is:

1. A non-volatile storage device comprising:
non-volatile memory;
a first controller that communicates using a first protocol on a first interface that provides external access to the non-volatile storage device; and
a second controller that communicates using a second protocol on a second interface that provides external access to the non-volatile storage device, the second controller retrieves parameters from the non-volatile memory in response to a request from the first controller, the second controller provides the retrieved parameters to the first controller, the parameters are specific to the non-volatile storage device, the second protocol is different than the first protocol.

2. A device as recited in claim 1, wherein:
the first controller provides the retrieved parameters over the first interface during enumeration of the non-volatile storage device on the first interface.

3. A device as recited in claim 1, wherein:
the parameters are settings for the first controller.

4. A device as recited in claim 1, wherein:
the parameters are stored at an address in the non-volatile memory that is not addressable from outside of the non-volatile storage device.

5. A device as recited in claim 1, wherein:
the first controller requests the parameters from the second controller by using one or more vendor specific commands that are permitted by the second protocol.

6. A device as recited in claim 5, wherein:
the first controller causes the second controller to enter a vendor specific mode of the second protocol prior to the first controller requesting the parameters.

7. A device as recited in claim 1, wherein:
the second controller only provides the parameters to the first controller if the request from the first controller is received when the second controller is in a vendor specific mode of the second protocol.

8. A device as recited in claim 1, wherein:
the first controller is a Universal Serial Bus (USB) card reader controller.

9. A device as recited in claim 1, wherein:
the second controller includes a Secure Digital (SD) controller.

10. A device as recited in claim 1, wherein:
the second controller includes a CompactFlash (CF) controller.

11. A device as recited in claim 1, wherein:
the second controller includes a Memory Stick (MS) controller.

12. A device as recited in claim 1, wherein:
the parameters are Universal Serial Bus (USB) descriptors.

13. A device as recited in claim 1, wherein:
the parameters include at least one of a product identifier, a vendor identifier, a product string, or a serial number of the device.

14. A non-volatile storage device comprising:
non-volatile memory;
a first integrated circuit that controls data transfer to and from the non-volatile memory, the first integrated circuit communicates using a first protocol over a first interface that provides internal access to the non-volatile memory; and
a second integrated circuit that communicates using a second protocol over a second interface that provides external access to the non-volatile memory, the second protocol is different than the first protocol, the second integrated circuit communicates using the first protocol over a third interface that is communicatively coupled to the first interface to form a communication link, the second integrated circuit requests the first integrated circuit for parameters pertaining to the non-volatile storage device using the first protocol over the communication link, the first integrated circuit retrieves the parameters from the non-volatile memory in response to the request from the second integrated circuit, the first integrated circuit provides the retrieved parameters over the communication link to the second integrated circuit.

15. A device as recited in claim 14, wherein:
the second integrated circuit provides the retrieved parameters to a host that is external to the device to enumerate the device on the second interface.

16. A device as recited in claim 14, wherein:
prior to requesting the parameters from the first integrated circuit, the second integrated circuit issues a command over the communication link to cause the first integrated circuit to enter a vendor specific mode of the first protocol.

17. A device as recited in claim 14, wherein:
to request the parameters from the first integrated circuit using the first protocol, the second integrated circuit issues one or more vendor specific commands to the first integrated circuit.

18. A device as recited in claim 14, wherein:
the first integrated circuit controls external access to the non-volatile memory using the first protocol.

19. A device as recited in claim 14, wherein:
the second integrated circuit includes a USB card reader controller that controls external access to the non-volatile memory using the second protocol.

20. A non-volatile storage device comprising:
non-volatile memory;
a first processor that communicates over an interface that provides external access to the non-volatile memory using a first protocol; and
a second processor that implements a set of vendor specific commands that is permitted by a second protocol that is different than the first protocol, the first processor issues a first command of the second protocol to the second processor to cause the second processor to enter a vendor specific mode of the second protocol, the first processor issues one or more vendor specific commands of the vendor specific command set to the second processor to request that the second processor provide parameters that pertain to the non-volatile storage device to the first processor, the second processor retrieves the parameters from the non-volatile memory if the second processor receives the one or more vendor specific commands while in the vendor specific mode, the second processor provides the retrieved parameters to the first processor.

21. A device as recited in claim 20, wherein:
the first processor provides the retrieved parameters to a host over the interface during enumeration of the non-volatile storage device onto the interface.

22. A device as recited in claim 20, wherein:
the second processor refuses to provide the parameters if the second processor receives a request for the parameters when the second processor is not in the vendor specific mode.

23. A device as recited in claim 20, wherein:
the vendor specific command set includes a first vendor specific command that indicates that a request is being made for the parameters and a second vendor specific command that requests that the parameters be transferred.

24. A device as recited in claim 20, wherein:
the first processor includes a Universal Serial Bus (USB) card reader controller.

25. A device as recited in claim 20, wherein:
the second processor communicates using the second protocol to allow external access to the non-volatile memory.

26. A method for providing device parameters, the method comprising:
requesting the device parameters from a first controller on a non-volatile storage device, the device parameters are specific to the non-volatile storage device, the requesting is performed by a second controller on the non-volatile storage device using a first communication protocol;
retrieving the device parameters from non-volatile memory on the non-volatile storage device, the retrieving is performed by the first controller in response to the requesting;
providing the retrieved parameters from the first controller to the second controller using the first communication protocol;
controlling external access to the non-volatile memory by the first controller using the first communication protocol; and
controlling external access to the non-volatile memory by the second controller using a second communication protocol that is different than the first communication protocol.

27. A method as recited in claim 26, further comprising:
providing the device parameters to a host coupled to the non-volatile storage device during enumeration of the non-volatile storage device in accordance with the second protocol.

28. A method as recited in claim 26, further comprising:
establishing settings for the first controller based on the device parameters.

29. A method as recited in claim 26, wherein:
the retrieving the device parameters includes retrieving the parameters from a location that is not addressable from outside of the non-volatile storage device.

30. A method as recited in claim 26, further comprising:
prior to the requesting the device parameters from the first controller, issuing a command from the second controller to cause the first controller to enter a vendor specific mode of the first protocol.

31. A method as recited in claim 30, wherein:
the requesting the device parameters includes issuing from the second controller to the first controller one or more vendor specific commands that are permitted by the first protocol.

32. A method as recited in claim 30, wherein:
the retrieving the device parameters is only performed if the first controller is in the vendor specific mode.

33. A method as recited in claim 30, further comprising:
responding that an illegal command was received by the first controller if the first controller receives a request for the parameters when the first controller is not in the vendor specific mode.

34. A method as recited in claim 33, wherein:
the responding that an illegal command was received is performed without firmware on the first controller that is programmed to respond to vendor specific commands of the first protocol receiving any vendor specific commands of the first protocol.

35. A method as recited in claim 26, wherein:
the device parameters include Universal Serial Bus (USB) descriptors.

36. A method as recited in claim 26, wherein:
the device parameters include at least one of a product identifier, a vendor identifier, a product string, or a serial number of the device.

37. A method of providing device parameters, the method comprising:
issuing one or more commands to request the device parameters, the parameters are specific to a non-volatile storage device that includes a first integrated circuit and a second integrated circuit, the one or more commands are issued to the first integrated circuit from the second integrated circuit using a first communication protocol;
retrieving, by the first integrated circuit, the device parameters from non-volatile memory on the non-volatile storage device;
providing the retrieved device parameters from the first integrated circuit to the second integrated circuit;
providing the retrieved device parameters from the second integrated circuit to a host coupled to the non-volatile storage device, the parameters are provided to the host using a second communication protocol that is different than the first communication protocol; and
controlling external access to the non-volatile memory by the first integrated circuit using the first communication protocol.

38. A method as recited in claim 37, wherein:
the issuing one or more commands includes issuing a command from the second integrated circuit to the first integrated circuit to cause the first integrated circuit to enter a vendor specific mode of the first protocol.

39. A method as recited in claim 37, further comprising:
responding that an illegal command was received by the first integrated circuit if the first integrated circuit receives a request for the parameters when the first integrated circuit is not in a vendor specific mode of the first protocol.

40. A method as recited in claim 37, wherein:
the providing the retrieved parameters to a host includes providing the parameters to the host during Universal Serial Bus (USB) enumeration.

41. The method as recited in claim 37, further comprising:
controlling external access to the non-volatile memory by the second integrated circuit using the second communication protocol.

42. A method for providing device parameters, the method comprising:
issuing a command to a first processor from a second processor on a non-volatile storage device to cause the first processor to enter a vendor specific mode of a first communication protocol;
issuing one or more vendor specific commands permitted by the first communication protocol, the one or more vendor specific commands request that the first processor provide the device parameters to the second processor, the device parameters pertain to the non-volatile storage device;
retrieving the device parameters from non-volatile memory on the non-volatile storage device if the first processor receives the one or more vendor specific commands while in the vendor specific mode;
providing the retrieved parameters from the first processor to the second processor; and
providing the retrieved parameters from the second processor to a host over an interface that is controlled by the second processor using a second communication protocol that is different than the first communication protocol.

43. A method as recited in claim 42, further comprising:
responding that an illegal command was received if the first processor receives a request for the parameters while not in the vendor specific mode.

44. A method as recited in claim 42, wherein:
the providing the retrieved parameters to the host includes controlling, by the second processor, enumeration of the non-volatile storage device.

45. A method as recited in claim 42, wherein:
the issuing one or more vendor specific commands includes issuing, by the second processor, a command that indicates that the parameters are being requested.

46. A method as recited in claim 45, wherein:
the issuing one or more vendor specific commands further includes issuing, by the second processor, a command that indicates that the parameters should be transferred to the second processor.

47. A method as recited in claim 42, further comprising:
indicating, by the first processor, that an erroneous command has been received if the first processor receives a command to transfer the parameters prior to the first processor receiving a command that the parameters are being requested.

48. A method as recited in claim 42, further comprising:
controlling external access to the non-volatile memory by the first processor using the first communication protocol.

49. A method as recited in claim 42, further comprising:
controlling external access to the non-volatile memory by the second processor using the second communication protocol.

* * * * *